Jan. 12, 1971 S. BERTRAM 3,555,546

ALTITUDE PROFILING APPARATUS

Filed Sept. 29, 1967 5 Sheets-Sheet 1

INVENTOR.
SIDNEY BERTRAM

BY
Lindenberg & Freilich
ATTORNEYS

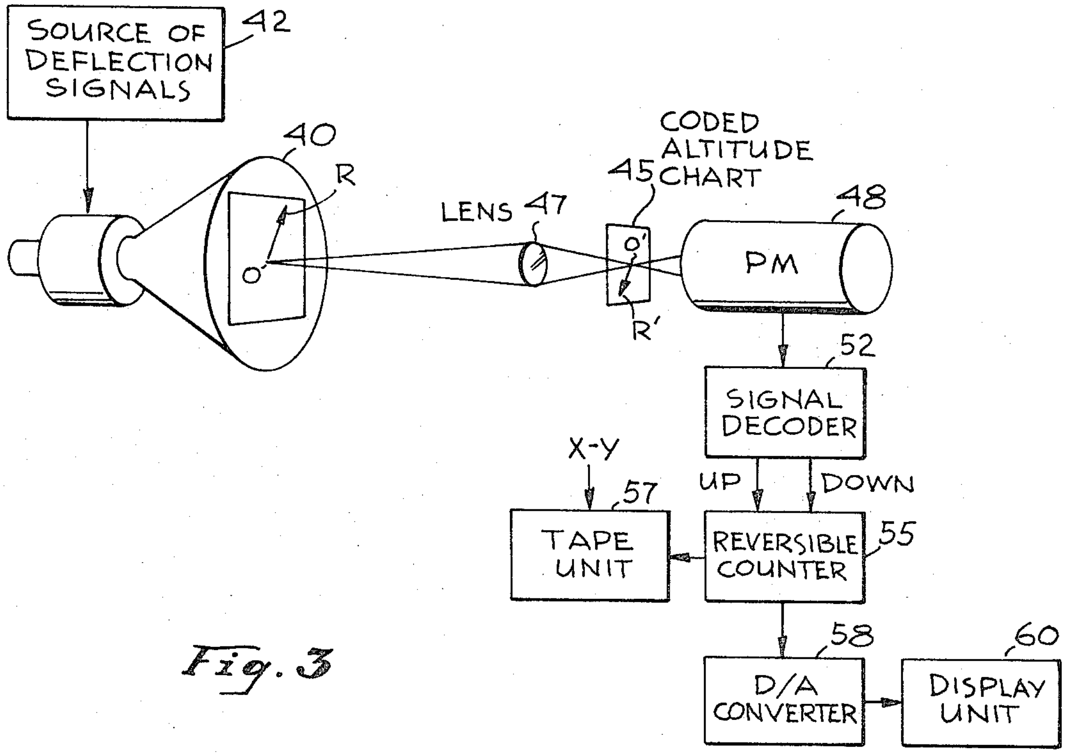
Fig. 3
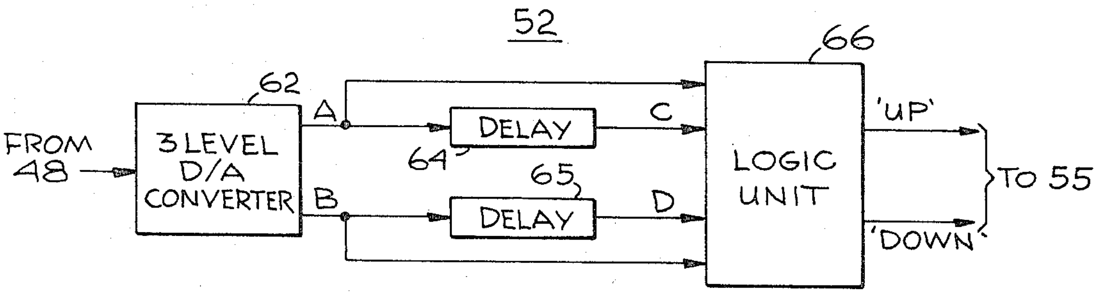
Fig. 4
| CODE ELEMENT | CONVERTER OUTPUT | |
|---|---|---|
| | A | B |
| WHITE | 0 | 0 |
| GRAY | 0 | 1 |
| BLACK | 1 | 0 |
Fig. 5
INVENTOR.
SIDNEY BERTRAM
BY Lindenberg & Freilich
ATTORNEYS

| EARLIER CODE ELEMENT OUTPUTS C \| D | PRESENT CODE ELEMENT OUTPUTS A \| B | OUTPUT OF LOGIC UNIT 66 |
|---|---|---|
| WHITE 0 \| 0 | GRAY 0 \| 1 | UP |
| GRAY 0 \| 1 | BLACK 1 \| 0 | UP |
| BLACK 1 \| 0 | WHITE 0 \| 0 | UP |
| GRAY 0 \| 1 | WHITE 0 \| 0 | DOWN |
| BLACK 1 \| 0 | GRAY 0 \| 1 | DOWN |
| WHITE 0 \| 0 | BLACK 1 \| 0 | DOWN |

INVENTOR.
SIDNEY BERTRAM
BY
Lindenberg & Freilich
ATTORNEYS

ALTITUDE PROFILING APPARATUS

INVENTOR.
SIDNEY BERTRAM
BY Lindenberg & Freilich
ATTORNEYS

INVENTOR.
SIDNEY BERTRAM
BY
Lindenberg Freilich
ATTORNEYS 3,555,546

ALTITUDE PROFILING APPARATUS

Sidney Bertram, Los Angeles, Calif., assignor to The Bunker-Ramo Corporation, Canoga Park, Calif., a corporation of Delaware Filed Sept. 29, 1967, Ser. No. 671,856
Int. Cl. G06k 7/14
U.S. Cl. 343—5 3 Claims

ABSTRACT OF THE DISCLOSURE

This invention consists of apparatus which utilizes a supplied chart in which data is stored in elementary regions, using one element of a multielement code to delineate the data quantum assigned to each elementary region. The equipment includes an arrangement with which the regions along any arbitrary defined path across the field of the chart are sensed to provide signals which are utilized to output the data profile along the selected path.

BACKGROUND OF THE INVENTION

(1) Field of the invention

This invention generally relates to a data reading system and, more particularly, to an apparatus for extracting data portrayed in a two-dimensional chart, wherein the functional relationship of a desired variable is shown by a distinguishable code at each elementary area.

(2) Description of the prior art

At present, systems are known in the art of photogrammetry which are capable of extracting detailed altitude data from stereoscopic photographs and of presenting the data in the form of a multitone altitude chart. One such system is described in an article entitled "The Universal Automatic Map Compilation Equipment" by the present applicant, published in "Photogrammetric Engineering" of March 1965.

Basically, the equipment or system described therein includes a computer which directs the centering of synchronous electronic scans on small areas of a stereoscopic pair of photographs that correspond to a given geographic position at an estimated altitude. Electronic correlators and auxiliary circuitry determine the error in the estimated height, permitting the computer to correct its height estimate for the particular geographic position or point, and to thus have a measured value for the point, and to make an estimate for a next point in a fixed profiling sequence.

The measured altitude for each geographic position is utilized in said system to modulate the intensity of a film-exposing device in order to produce a two-dimensional altitude chart. Therein a given contour interval or altitude range is delineated as a band or region of constant tone and successive contour intervals by bands of different tones, with, for example, the tones running through the trinary sequence or order white, gray, black, white, etc., in moving through a field on a path of increasing altitude. The trinary sequence or order permits an unambiguous determination of the change in altitude in moving from one region to the next; the reverse sequence to the above, i.e., white, black, gray, white, etc., would therefore represent a path of decreasing altitude. It will be seen that the conventional contour lines show up on such a chart as the boundaries between tone changes and that altitude values can be assigned to the lines by algebraically counting the tone changes starting from any point of known elevation, with the count proceeding at an interval appropriate to the chart.

Simultaneously with the production of the altitude chart, the measured height for each geographic point, as stored in the computer, may be output in either analog or digital form. For example, a magnetic tape is currently used to store the height for each measured position. Since the height of each geographic point is available only in the order in which the point was measured along the fixed scanning profile, the data is output to the tape in the same order. Such order may be satisfactory for certain calculations in which the order of altitude data on the tape is not important. However, for some operations such a fixed order may be most undesirable.

For example, let it be assumed that the tape stores altitude data on a north-south basis for a succession of profile lines. Then, if it is required to obtain the altitude profile radially outward from a given point in a direction other than north-south, successive altitude values would have to be read from different blocks of data on the tape, where each block of data contains the altitude values of all the points along a different profile line. Such read out could only be obtained with a complex tape read out system operating with a digital computer and the required search routine would slow down the computer operations. Thus a need exists for a relatively simple system which is capable of providing signals which represent an altitude profile radially outward in any desired direction from a given point on an altitude chart, in which successive altitude intervals are represented by regions delineated by different gray tones.

OBJECTS AND SUMMARY OF THE INVENTION

It is a primary object of the present invention to provide a new system for reading out data contained in a two-dimensional chart in which a third dimension is represented by a defined set of distinguishable regions.

A further object of the invention is the provision of a system capable of providing a sequence of signals representative of an altitude profile extending along any desired path from a given point in a multitone altitude chart.

Still a further object is to provide an apparatus which utilizes a supplied chart in which data is stored in elementary regions using one element of a multielement code to delineate the data quantum assigned to each elementary region and to output the data profile along an arbitrarily defined path across the field of the chart.

Still a further object is to provide a system which utilizes a supplied two-dimensional chart in which data is stored in the form of points in regions coded by elements of a multielement code, the regions defining fixed data quanta, with the order of the elements defining an increased data level change, the system providing signals representing the changes of data level from any selected point along any desired radial direction.

Yet another object of the invention is to provide an apparatus which may be used with a multitone altitude chart in which adjacent altitude ranges are represented by regions of different tones, and which is capable of providing digital and/or analog signals describing the altitude profile from any desired point of the chart along an arbitrary path from the point.

Still a further object of the invention is to provide a system for obtaining and utilizing altitude data between any two points on a two-dimensional chart in which the altitude of each point in the two-dimensional field of the chart is represented by one of a plurality of tones.

These and other objects of the invention are achieved by providing an apparatus which, in essence, automatically performs the same operation which a person would perform when reading such a chart. Basically, given a multitone altitude chart in which the tones or gray levels are clearly defined and distinguishable, a person would determine the altitude profile from any given point of known altitude along a desired path by algebraically adding an amount corresponding to the contour interval of the chart at each tone change, and wherein the sign of the addend is determined by the tone change as corresponding to an increasing or decreasing altitude. The present invention includes an apparatus for mechanizing this process.

Briefly, in one embodiment of the invention, the system includes a scanner which is operable to scan the chart from a given point in a selected radial direction. The light in passing through the chart at any given position is modulated (its intensity varied) in accordance with the coding (gray tone) at the selected position. The light is collected by a photocell whose electrical output is supplied as an input to a decoder wherein it is compared with the previously received signal from the photocell to determine the direction of altitude change. When two adjacent tones are found to be in a sequence representing an increasing altitude, an up signal is supplied by the decoder. On the other hand, a down signal is supplied when two adjacent tones are in a sequence which indicates a decreasing altitude.

The system also includes an up-down counter which is initially set to a count related to the known altitude of the start point. The up and down signals are supplied to the counter so that at any time during the operation the count in the counter represents an altitude which is related to that of the particular point sensed. A digital-to-analog (D/A) converter, operating from the counter, may be used to generate a voltage corresponding to the altitude count. This voltage can control the deflection along one axis of an XY plotter or any other two-dimensional display device so as to produce a graphic presentation of the altitude profile from the start point along the selected path.

The novel features of the invention are set forth with particularity in the appended claims. The invention will best be understood from the following description when read in conjunction with the accompanying drawings.

BRIEF DESCRIPTION OF THE DRAWINGS

FIG. 3 is a block diagram of one basic embodiment of the present invention;

FIG. 4 is a detailed block diagram of the decoder shown in FIG. 3;

FIGS. 5 and 6 are charts used in explaining the operation of the arrangement shown in FIG. 4;

FIG. 7 depicts a logic gate arrangement which may be usefully included in the logic unit shown in FIG. 4;

DESCRIPTION OF THE PREFERRED EMBODIMENTS

Figure 1:
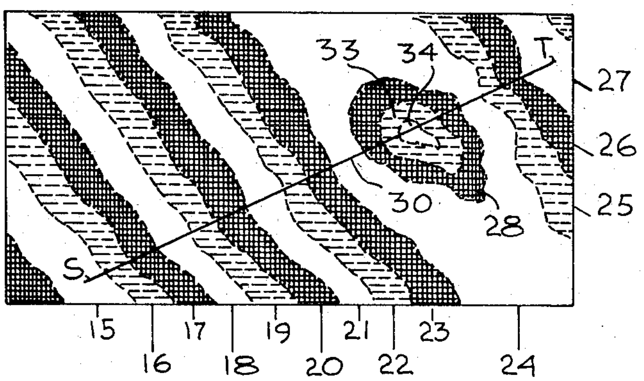
FIG. 1 is one example of a chart of a type useful with the apparatus of the present invention.

Reference is now made to FIG. 1, which is a two-dimensional chart of the type which is assumed to be supplied to the system of the present invention. The fundamental features of the chart will first be explained, since the unforeseen advantages realizable from the system of the present invention can only be appreciated in the content of the chart characteristics.

Briefly, the two-dimensional chart contains data which is diagrammed therein in a plurality of chart segments or regions, some of which are designated by reference numerals 15–27. Each region is coded to represent an element of a multielement code. In FIG. 1, the code consists of three well defined tones or gray levels, described as white, gray, and black. The black and gray are represented by cross-hedged and dashed lines respectively. Each region represents an equal data quantum. Any point or incremental area in the same region may be assumed to define the same data level within the quantization accuracy. Thus, for example, all points or incremental areas in the white region 18 are assumed to represent or store the same data level, while all points or incremental areas in the adjacent gray region 19 are assumed to be at the next higher data level.

It should be noted, however, that the representation has an inherently greater accuracy than the quantization and that this can be realized through elementary interpolation techniques. For example, the point S in region 15 in FIG. 1 is about halfway between quantum changes and therefore can be assigned a corresponding fractional value.

Assuming that region 15 represents the altitude range between 1,000 and 1,010 feet, the point S can be assigned the altitude of 1,005 feet, since it lies halfway between the 1,000 and 1,010 feet crossings.

The coded regions are arranged so that the order of appearance of the code elements in moving across the chart corresponds to the direction of change of the data level. For example, assuming that a code order of white, gray, black, white, etc., represents a direction of positive change of data level (i.e., increasing altitude), then from FIG. 1 and from the foregoing explanation it should be appreciated that a point in region 19 is at a higher data level than one in region 18, while being at a lower data level than a point in region 20, since regions 18, 19, and 20 are white, gray, and black, respectively. Similarly, when one moves along the chart from region 22 into region 23, an increase in the data level is experienced. The increase is equal to the data quantum represented by each of the regions. A similar increase in data level is experienced when crossing from region 23 into region 24, since the change is from a black region into a white region, i.e., from an earlier to a later element in the particular code order. On the other hand, when crossing from white region 24 into black region 28, a decrease in data level is experienced, since the order of the element crossing is opposite to that of the white, gray, black, white positive sequence code order.

The chart of FIG. 1 is in a sense similar to a chart shown and described in the aforementioned article. Therein the data represented in the chart consists of the altitudes of geographical points or incremental areas, which together form a representation of a portion of terrain. It should, however, be appreciated that such a data charting technique need not be limited to charting or displaying altitudes, but may be employed to represent any type of data which lends itself to such multicode representation. Also, the code employed need not be limited to three elements, which, however, represents the minimum number required to enable one to define the direction of data level changes. Thus generalizing, the number of elements of the code could be $n$, where $n$ is not less than 3. Furthermore, any easily sensed multielement coding technique could be employed. The only requirement is that the boundaries between the regions be easily ascertainable and that the code in each region be readily available and unambiguous. For example, coding may be accomplished by controlling the chart's optical characteristics, such as light transmissivity or reflectance, by electrostatic charging, or by any other technique where the properties of the chart which can be sensed are made to vary from region to region in accordance with the function to be represented.

For explanatory purposes only, let it be assumed that the chart of FIG. 1, in conjunction with which the invention will hereafter be described in detail, is an altitude chart in which the data quantum represented by each region is an altitude range of 10 feet and that a code order of white, gray, black, white, etc., represents an increasing altitude. It is further assumed that coding is accomplished by controlling the chart's transparency so that a region coded black is substantially opaque, a region coded gray has a transparency close to 50%, and regions coded which are essentially transparent. In addition, let it be assumed that the altitude variations or profile between point S and a point T in region 27 along line 30 is required and that S is assumed to be an altitude of 1,005 feet (halfway between the 1,000 and 1,010 positions).

Figure 2:
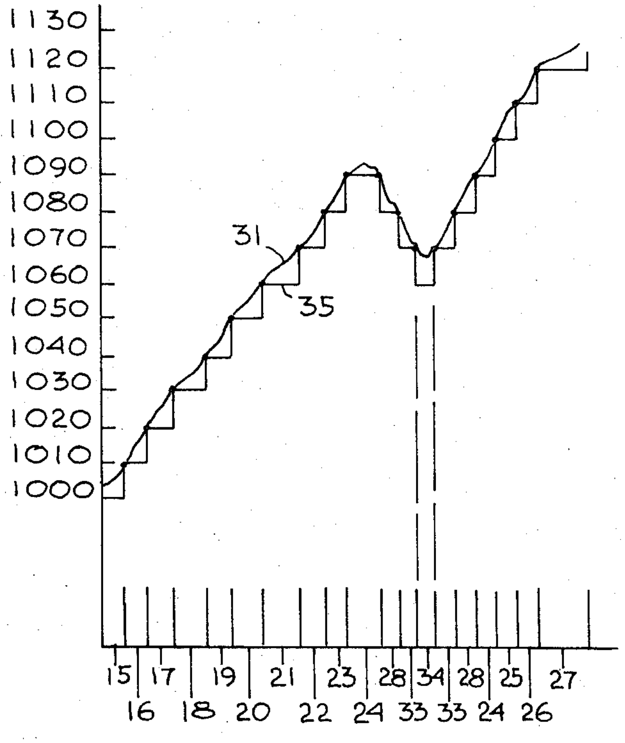
FIG. 2 is a diagram of altitude profiles along the line 30 shown in FIG. 1.

A trained operator would have little difficulty in determining the altitude of point T and in producing the required profile. Knowing the altitude of the region of point S, he would move a marker along line 30, adding or subtracting 10 feet from the last determined altitude whenever the marker crosses into a new region, thus obtaining a series of points on the profile. He would add 10 feet whenever the crossing occurs between regions which represent elements in the positive code order and subtract 10 feet whenever the order is reversed. This process would proceed as the operator moves his marker along line 30 until region 27 is entered. The boundary between regions 26 and 27 represents an altitude of 1,120 feet. The height of point T is determined to be 1,126, wherein the six is obtained by interpolation between the 1,120 and 1,130 crossings. The altitude levels determined for the crossings between regions along line 30 could be used to plot the altitude profile between S and T by drawing a smooth curve through points corresponding to the abstracted values. Such an altitude profile is diagrammed in FIG. 2, being designated therein by numeral 31. In FIG. 2 the numbers along the abscissa represent the reference numerals of the various regions along line 30 shown in FIG. 1.

For a number of important technical applications, it is necessary to obtain many such profiles to adequately describe a given operation in the map area. For such applications it is important to automate the process so that the data can be made available on a timely basis and at a reasonable cost. It is to eliminate these expenses, speed up the operation, and reduce the possible human error in the calculations and the plotting of the profiles that the present invention is directed.

Basically, the present invention consists of equipment which automatically performs the process hereinbefore described. In the simplest form, the equipment consists of a sensing device, such as a scanner, that is designed to move over the chart from any start point, such as points S, along any desired path, such as line 30, and to provide signals which are indicative of the altitudes of the regions which are sensed or scanned. Hereafter the terms "sensing" and "scanning" may be used interchangeably. Thus, when using a chart in which the coding is performed by controlling the transparency of the chart, as hereinbefore assumed in connection with FIG. 1, the sensing arrangement provides a signal of a maximum amplitude when sensing a white region, a signal of minimum amplitude when sensing a black region, and a signal with an in-between level when sensing a gray region.

During the sensing process, the last generated signal is compared with a previously received signal in a decoding network to determine the direction of change of the signal level, which represents the direction of change of the code elements along line 30. An up counting signal or up signal is supplied whenever the direction of change corresponds to the code order which is assumed to represent a positive change of altitude, while a down signal is supplied whenever the direction of code element change is opposite to the defined code order. Thus, for example, when crossing from region 20 into region 21, an up signal will be provided, while a down signal will be produced when crossing from region 21 into region 22.

These up and down signals are applied to a reversible counter which may be initially set to a count which represents the lower boundary of the altitude of the region 15 which contains point S. Thus, at any time during the operation, the count in the counter will represent the altitude of the lower boundary of the region being sensed. A D/A converter operating from the counter may be used to generate a voltage corresponding to the altitude count. This voltage might be utilized to control, for example, the deflection of an XY plotter or any other plotting or display device in order to produce, as the sensing progresses, the altitude profile such as the one designated by numeral 35 in FIG. 2. Using this simple form of the apparatus, the profile would appear as a series of steps approximating the smooth curve that might have been sketched using a manual operation.

Reference is now made to FIG. 3, which is a simplified block diagram of one embodiment of the invention capable of dynamically displaying an autitude profile, such as the one shown in FIG. 2, on an oscilloscope or other display device. Therein, the sensing arrangement is shown comprised of a scanning device, such as a flying spot scanner 40, provided with deflection signals from a source of deflection signals 42. The spot of the scanner 40 is shown focused onto a coded altitude chart 45, similar to the chart shown in FIG. 1, by means of a lens 47.

Assuming that the spot or trace on the scanner starts at an origin O and moves on some radial line toward a point R, it will be appreciated that the spot would move on the altitude chart 45 along a corresponding radial direction, designated O'R'. Considering the foregoing description of FIG. 2, points O' and R' are analogous to points S and T, respectively. The light of the scanner 40 passes through the chart 45 to a photomultiplier 48 whose output level is directly related to the amount of light collected thereby. For the foregoing example, it will be appreciated that the amount of light collected by the photomultiplier would depend upon the coding of the particular region which is being scanned or sensed by the image of the spot. The output level of the multiplier would be a maximum when a white or transparent region is scanned, a minimum when a black or opaque region is scanned, and an in-between level when light passes to the photomultiplier through a gray region.

The output signal of the photomultiplier 48 is supplied to a signal decoder 52 which senses changes in the output amplitude of the photomultiplier, occurring when scanning passes from one region to another, as well as the direction of the change. If the change in amplitude is one which indicates that scanning has passed from one region to an adjacent region representing code elements in the defined sequence, the decoder 52 provides an up signal. However, if the code elements represented by the two successively scanned regions are in an order opposite to the defined order, a down signal is supplied.

The up and down signals are supplied to a reversible counter 55. The counter could be initially set to the count or value representing the lower boundary of the altitude of the region containing the start point so that thereafter its count corresponds to the lower boundary of the altitude of the region which contains the point being sensed by the current position of the spot on the chart 45. The count in counter 55, which is assumed to be in digital form, may be supplied to a tape unit 57 to be recorded therein for subsequent use. The count of the counter 55 may also be supplied to a digital-to-analog (D/A) converter 58 whose output would be a voltage which corresponds to the digital altitude count in the counter. Such voltage may be supplied to a display unit 60, which may consist of an oscilloscope or any other type of two-dimensional display apparatus. By applying the voltage from converter 58 to the vertical deflection input of such a display unit and synchronizing the horizontal deflection input of such a unit with the radial deflection signals supplied by source 42, the unit would display the step-like altitude profile, similar to that shown by line 35 in FIG. 2, as the scanning progresses.

The various circuits or devices shown in FIG. 3, except for the signal decoder 52, are well known in the art, and therefore their description in block form is deemed sufficient. For a better understanding of the operation of the signal decoder 52 and for a description of one specific embodiment thereof, reference is now made to FIG. 4. The specific embodiment of the decoder is presented only as exemplary of a circuit capable of performing the functions of the decoder hereinbefore described. Basically, the decoder is shown consisting of a three level D/A converter 62 to which the output of photomultiplier 48 is supplied. This output may have any one of three levels or amplitudes. The converter 62 has two outputs designated A and B. Each output may be at a low or zero level, which hereinafter is also referred to as false and represented by a 0, or at a high level hereafter referred to as true and represented by 1. Thus the two outputs with two possible levels of each are used to provide two bit numbers which represent the three levels of the signal from the photomultiplier 48.

One possible relationship between the code elements and the converter outputs is charted in FIG. 5, to which reference is made herein. Therein it is assumed that when a white region is scanned, converter 62 provides a binary number 00 on outputs A and B, binary number 01 is provided when scanning a gray region, and the binary number 10 is produced while scanning a black region. Thus the two-bit digital output of the converter 62 at any time is directly related to and representative of the code element which is being scanned. Output A of converter 62 is supplied to a delay unit 64 whose output designated C is in turn connected to a logic unit 66. Similarly, output B of converter 62 is supplied to a delay unit 65 whose output D is also supplied to logic unit 66. In addition, outputs A and B of converter 62 are directly connected to logic unit 66.

Briefly, the function of the delay units 64 and 65 is to delay the two-bit number at outputs A and B of converter 62, so that at any given time digital signals representing the presently scanned code element and an earlier scanned code element are available simultaneously for operation by the logic unit 66. The two-bit digital signal or number at outputs C and D may thus be thought of as representing a previously or earlier scanned code element, while the digital signal or number at outputs A and B represents the presently scanned code element.

For the particular order of white, gray, black, white, etc., which represents a positive altitude change, the logic unit 66 is operated to provide an up signal whenever the earlier code element is white, gray, or black and the present code element is gray, black, or white, respectively. A down signal is provided whenever the order is reversed. The logic operations to be performed by unit 66 are best summarized in FIG. 6 in chart form. Therein, the various code element relationships and the binary values at outputs A through D, necessary for providing the up and down signals, are charted.

Figures 6, 7:
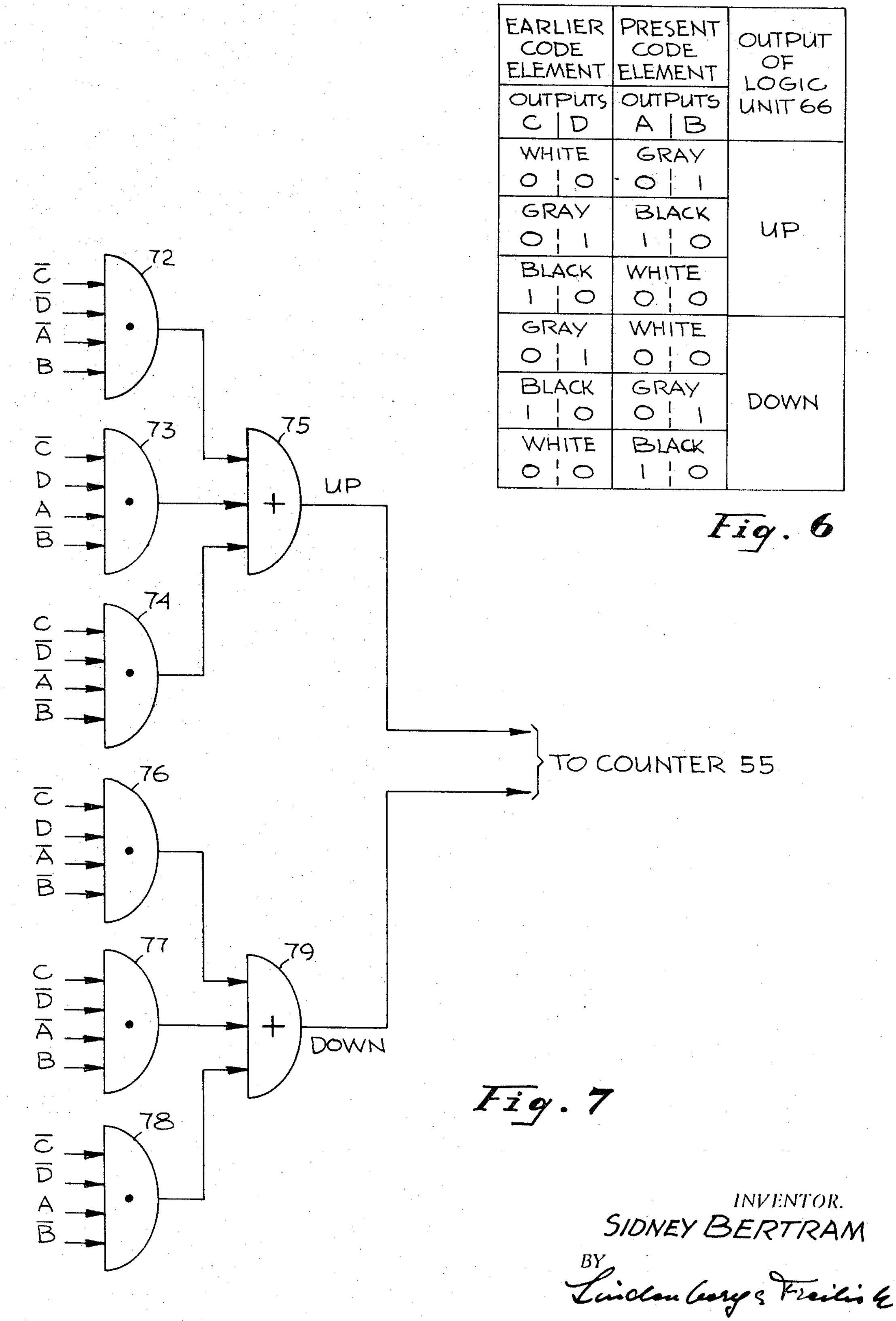

One simple logic implementation of unit 66 is diagrammed in FIG. 7, to which reference is made herein. Therein, AND gate 72 performs the logic operation necessary for providing the up signal whenever a gray code element is scanned after the scanning of a white code element, as indicated by the presence of a binary number 01 at outputs A and B and a binary signal 00 at outputs C and D. Similarly, AND gate 73 provides the signal necessary to indicate a scanning transition from gray to black while AND gate 74 provides a true output whenever the scanning transition is from a black code element to a white code element. The outputs of the three AND gates are fed to an OR gate 75 whose output, when true, represents an up signal which is supplied to counter 55 to increment the count therein. In a similar manner, AND gates 76, 77, and 78 together with OR gate 79 are employed to provide a down signal whenever the scanning transition is from one code element to another, which is in an order opposite to that of the order indicating a positive altitude change.

From the foregoing description, it should thus be appreciated that the system of the present invention is capable of automatically producing signals such as the count of counter 55, which represents the altitude of any point on the chart. Also the system can provide signals from which an altitude profile from any start point along any radial direction may be plotted. Since the direction of altitude change is defined in terms of the order of the code elements, at least three code elements are required. Three code elements may suffice for most applications.

It is appreciated that the accuracy and resolution of the system are only limited by the characteristics of the scanner, the chart alignment in the device, and related circuitry. Higher accuracy can be obtained by mounting the chart on a mechanical stage or table which is movable under computer control so that at any given time during the scanning a precise incremental area of known coordinates is being examined by the sensing apparatus.

It should further be appreciated that by decreasing the data quantum, such as the altitude range, which each region defines, a smoother altitude profile (see FIG. 2) would be produced. This may also be accomplished by supplying the output of counter 55 and the deflection signals from source 42 to a display device which is capable of displaying a line joining adjacent input values rather than a step for each change of the counter's output. Also the sensing or scanning pattern may be modified and circuitry added to obtain interpolated altitude values for points within a chart region.

For example, at each point along the profile (line 30 of FIG. 1), the sensing arrangement may move forward until the next succeeding region boundary is sensed and then move backward to sense the previously scanned boundary. By comparing the times required to reach the two boundaries, the position of the point within the region could be determined. Knowing the altitude range which each region represents, a number could then be generated indicating the altitude of the point above the lower boundary of the region's altitude contained as a count of counter 55. These signals could therefore be combined to provide an interpolated output representing the altitude of the point which is sensed or scanned.

In light of the teachings disclosed herein, various modifications may be suggested without departing from the spirit of the invention. For example, the system may be modified to scan substantially parallel lines along a desired direction and simultaneously display the various profiles at differing intensities. Such an arrangement would show an operator the potential improvement in a desired charicteristic that could be achieved by moving the line and thus expedite the determination of the best line for a desired characteristic.

It should also be pointed out that the system or equipment shown in FIG. 1 could be utilized to extract the data from a chart in which the various code elements are delineated by regions of different light reflectance properties. Thus, a black region may be assumed to exhibit zero light reflectivity, a gray region 50%, and a white region 100% reflectivity. With such a chart, the photomultiplier 48 is positioned so that light reflected (rather than transmitted) from the chart may be directed thereto.

In addition to such possible modifications, it is appreciated that the capability to automatically extract altitude data from the chart can be used in various problems which require altitude information relative to a given area to be available on a timely basis during the development of a solution to the problem. One such problem is the prediction of the probable coverage of a radar antenna as a function of the height of the terrain about the proposed antenna location. Basically, such a problem can be solved if the altitudes along each radial from the antenna position as the start point are available in sequence. The system of the present invention which produces such altitudes in sequence is therefore particularly useful in the solution of such a problem.

Figure 8:
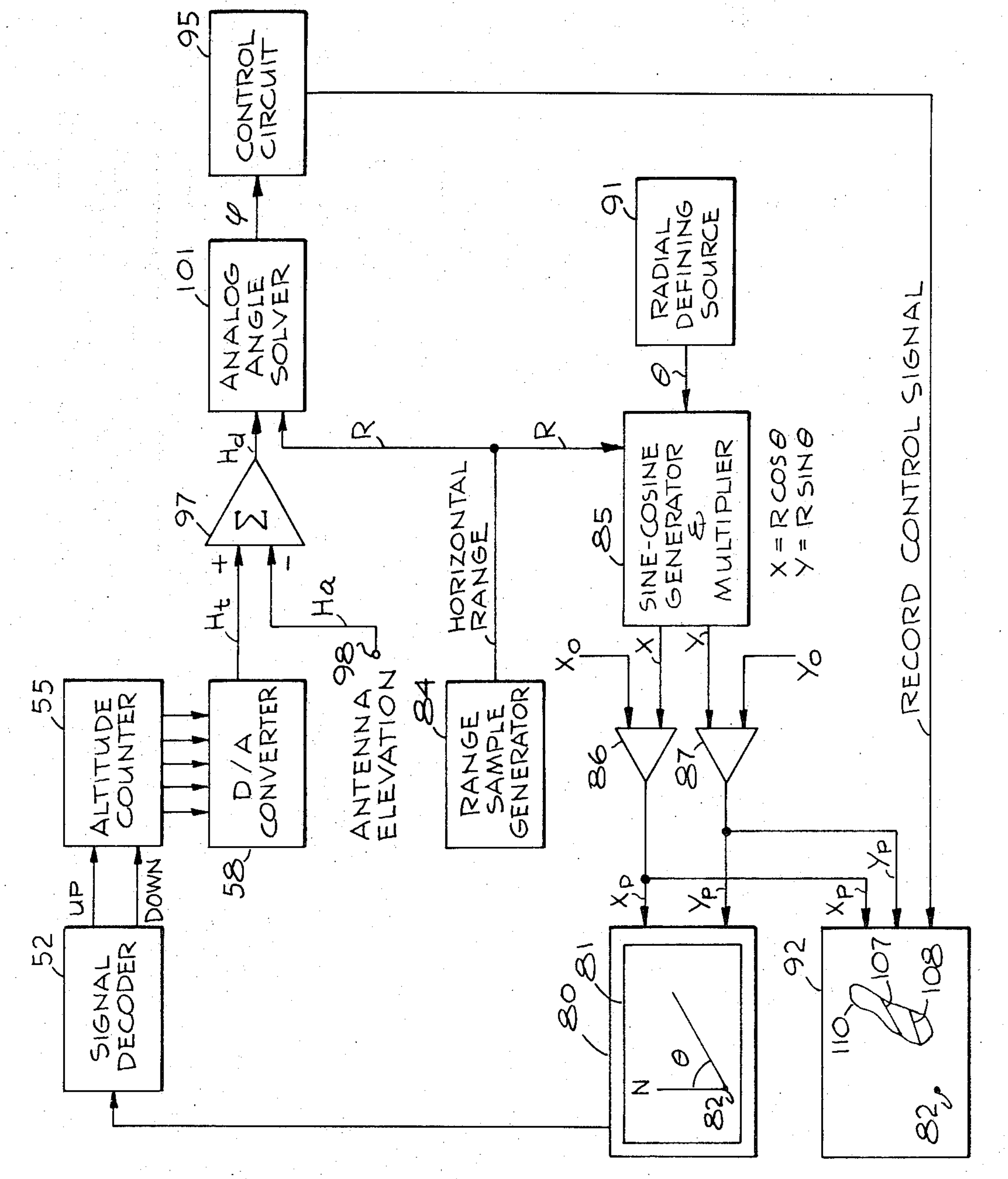
FIG. 8 represents an embodiment of the present invention adapted to examine terrain representations and delineate those areas having predetermined characteristics.
Figure 9:
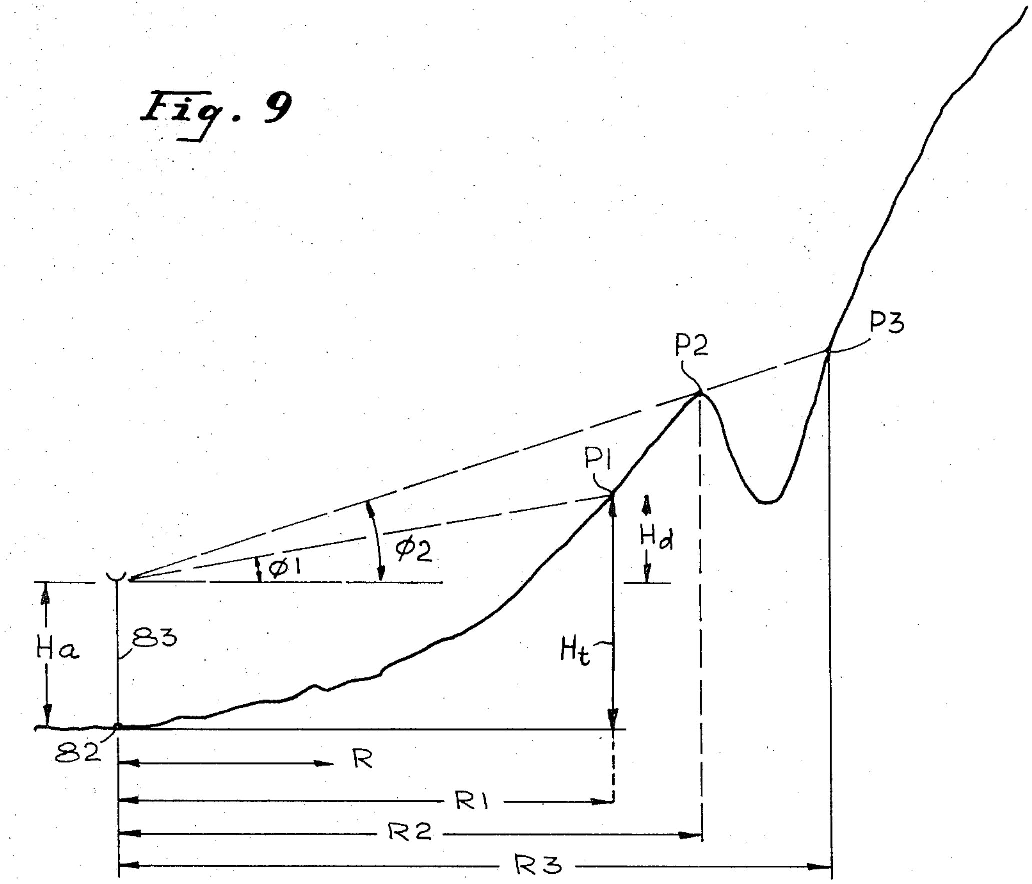
FIG. 9 is a profile type diagram useful in explaining the purpose and operation of the arrangement shown in FIG. 8.

For an understanding of how the present system may be incorporated with other circuits or devices to solve such a problem, reference is now made to FIG. 8. Therein elements similar to those previously described are designated by like numerals. An altitude reader 80 performs the function of scanner 40 and photomultiplier 48. The reader is shown supporting a chart 81 assumed to include a point 82 at which an antenna 83 (see FIG. 9) is positioned. The antenna of a height $H_a$ is shown in FIG. 9, which represents an exemplary altitude profile along a radial and an angle $\theta$ with respect to a reference line such as North (N) (FIG. 8). A range sample generator 84, a sine-cosine generator and multiplier 85, and signal adders 86 and 87 provide the reader 82 with deflection signals $X_p$ and $Y_p$ in correspondence with the element in the geographic field to be sensed.

To determine the radar coverage of the antenna placed at 82 along the radial defined by $\theta$, a signal correspondign to $\theta$ is supplied to element 85 from a radial-defining source 91. The signal $\theta$ is constant for each radial scan. The range sample generator 84 develops a signal R which corresponds to the horizontal range R from the antenna at which the altitude is to be determined at the given time. The signal R may start at zero or any minimum value and increase at an appropriate rate, very fast for modest accuracy and at a slower rate for higher accuracy.

The range signal R and the radial signal $\theta$ are resolved in circuit 85 into components $X=R \cos \theta$ and $Y=R \sin \theta$ which are supplied to adders 86 and 87, respectively. These circuits, which are also supplied with signals $X_o$ and $Y_o$ which represent the X and Y coordinates of the antenna location at point 82, provide signals $X_p$ and $Y_p$ which are the positioning signals supplied to reader 80 in order to continuously control the scanning of successive points along the radial line defined by $\theta$. These deflection signals ($X_p$ and $Y_p$) are also supplied to an XY plotter 92 or other two-dimensional display device so that it is positioned at a position corresponding to the point currently sensed or read on the chart. The plotting, however, is controlled by a record control signal from a control circuit 95.

As the signal R from generator 84 increases, the scanning of the chart 81 progresses along the radial defined by $\theta$, and the signals from the reader 80 are supplied to decoder 52. It, together with the counter 55 and D/A converter 58, operates as hereinbefore described to provide the analog voltage $H_t$ which represents the altitude of the scanned point. As previously explained, such a voltage could be used to control the plotting of an altitude profile.

In the presently described arrangement, however, the instantaneous voltage $H_t$ is supplied to one input of a summing circuit 97. A signal $H_a$ corresponding to the antenna height $H_a$ is supplied as another input from a source simply designated 98. The output of circuit 97 is a voltage $H_d$, where $H_d=H_t-H_a$, which is positive whenever the altitude of a point is above the antenna altitude. One such point is designated in FIG. 9 by P1 which is at a horizontal range R1 from antenna 83 and at a height $H_t$ above point 82. Thus, for point P1, $H_d=H_t-H_a$.

Figure 10:
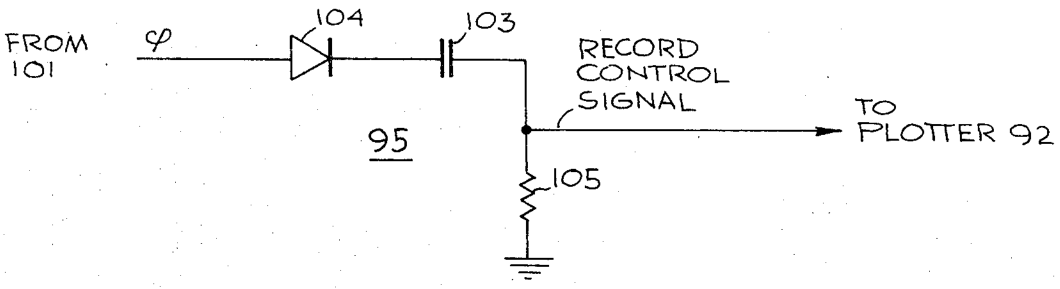
FIG. 10 is a schematic diagram of a control circuit useful in the embodiment of the invention shown in FIG. 8.

The voltage $H_d$ from 84 is supplied to an analog angle computer 101. This angle computer provides an output voltage which corresponds to $\phi=\arctan H_d/R$. For point P1, the output voltage of computer 101 would represent the angle $\phi$. The output voltage of computer 101 is supplied to control circuit 95, which includes a storage element, such as capacitor 103 shown in FIG. 10. The circuit shown in FIG. 10 is one exemplary embodiment of circuit 95.

The capacitor 103 is shown associated with a diode 104 and a charging resistor 105. The charge of 103 increases as $\phi$ increases and remains unaltered when any instantaneous $\phi$ is equal to or less than a previously supplied $\phi$ value. Thus, a charging current and therefore a voltage potential are present across resistor 105 so long as $\phi$ increases in value. In the profile of FIG. 9, this would occur until peak point P2 is reached, at a horizontal range of R2. All points up to P2 represent terrain along radial $\theta$ which would be seen by antenna 83, since each successive point along the profile is at a higher altitude than the previously scanned points. When R2 is reached, the charge of 103 represents the angle $\phi 2$.

When R equals R3 and the altitude of P3 is derived, the instantaneous value of $\phi$ supplied by 101 equals the charge of 103 representing $\phi 2$. Thus point P3 is assumed to be seen by the antenna. Similarly, all points shown in the figure having a horizontal range of $R>R3$ would be seen by the antenna. However, when R is between R2 and R3, when the altitudes of points between P2 and P3 are derived and utilized, the value of $\phi$ supplied by 101 is less than the value of $\phi$ stored as a charge of capacitor 103. Consequently the capacitor's charge would not increase as R increases from R2 to R3. The absence of a charging current or potential across resistor 105 represents the record control signal which is supplied to plotter 92 to actuate it to plot a line 107 on an appropriate sheet or display surface. Thus, line 107 represents the terrain portion along radial $\theta$ which is not covered by the antenna 83 at point 82.

After R reaches a maximum value, representing the maximum horizontal range of interest, generator 84 is reset and capacitor 103 is discharged. The angle defining source 91 (FIG. 9) is then adjusted to provide a new value of $\theta$ to control the scanning along a new radial line. During such scan, a line 108 analogous to 107 may be plotted. As a result, when the scanning operation for all values of $\theta$ has been completed, the various plotted lines will in combination delinate one or more areas, such as 110, which represent the terrain in two dimensions which is not covered by the radar from the antenna 83. Instead of plotting the areas not seen by the radar antenna, if desired, the areas seen by the antenna may be plotted. This is easily achieved by using the presence of a potential across resistor 105 as the record control signal.

A variation of the system just described could be used to provide visibility patterns for aircraft traffic near the radar antenna. For such an application, the maximum angle as held in the control circuit 95 would be converted to an equivalent altitude using the relationship $$H_R=H_a+R \tan \phi \max$$

Since an airplane flying above the calculated altitude would be visible, the value could be used to plot the minimum visible altitude, perhaps again as a three tone chart or as a set of diagrams for flights of given altitudes.

Although particular embodiments of the invention have been described and illustrated herein, it is recognized that modifications and variations may readily occur to those skilled in the art, and consequently it is intended that the claims be interpreted to cover such modifications and equivalents.

The embodiments of the invention in which an exclusive property or privilege is claimed are defined as follows:

1. Apparatus for employing a coded two-dimensional altitude chart of a predetermined terrain for producing a corresponding output chart having a plot therein delineating those areas of the terrain which would not be covered when the terrain is scanned by a radar antenna of known height and location with respect to the terrain, said altitude chart being arranged so that altitude data is indicated thereon using combinations of three possible bands of different optical properties with respect to an applied light beam with each band representing a given altitude interval and with the bands arranged so that the particular sequence of any two thereof in any direction indicates whether the terrain undergoes a positive or negative altitude interval in that direction, said apparatus comprising:

scanning means including a cathode ray tube for producing a light beam for scanning said altitude chart;

positioning means for providing positioning signals to said scanning means to cause scanning of said altitude chart along radial paths corresponding to the radial scanning of said antenna and starting from a point on the altitude chart corresponding to the location of said antenna;

first means responsive to said scanning for providing a different valued output signal in response to the scanning of each of the three different bands of said altitude chart;

second means responsive to said first means for providing an up signal when the successive output signals obtained during scanning of said altitude chart correspond to a positive altitude interval and a down signal when they correspond to a negative altitude interval;

a reversible counter settable at the start of each radial scan to an initial count representing the location of the radar antenna on said altitude chart and responsive to the first and second outputs provided by said second means during each radial scan so that the count of said counter respectively corresponds to the altitude of the terrain traversed during the scan;

said positioning means also providing a range signal during each radial scan representing the range from the starting point to the maximum radial position of the scan;

means for providing an antenna height signal representative of the height of said antenna;

first calculating means responsive to the count of said counter and also to said range signal from said positioning means and to said antenna height signal for providing during each radial scan an angle-defining signal whose amplitude is directly related to the angle whose tangent equals a magnitude related to said count divided by the magnitude of said range signal;

a two-dimensional plotter responsive to said positioning signals for providing plotting movement in correspondence with the scanning of said altitude chart; and second calculating means responsive to said angle-defining signal for controlling the recording output of said plotter dependent upon whether the amplitude of the angle defining signal being produced during a radial scan is less than that produced during a preceding portion of that radial scan so that after all desired areas of said altitude chart have been scanned the output chart produced by said plotter will delineate those areas of the terrain which would not be covered when scanned by said antenna.

2. The invention in accordance with claim 1, wherein said second calculating means includes a capacitor and a charging resistor to which said angle-defining signal is applied for producing a charging current therethrough so long as the amplitude of said angle-defining signal increases in value, the resulting output voltage across said resistor being applied to said plotter for controlling the recording thereof.

3. The invention in accordance with claim 2, wherein said three different bands of different optical properties are respectively constituted by an opaque region, a transparent region and a region with a light transmissivity of approximately 50%, and wherein said second means includes delay means to which each output signal from said first means is applied to cause the output signal for the band presently being scanned and the output signal for the immediately preceding band to be simultaneously available, and wherein said second means further includes means for comparing the presently occurring and delayed output signals obtained from said first means and for producing said up and down signals.

References Cited

UNITED STATES PATENTS

| | | | |
|---|---|---|---|
| 2,803,406 | 8/1957 | Nuttall | 235—92 |
| 3,067,526 | 12/1962 | Gray et al. | 35—10.4 |
| 3,131,247 | 4/1964 | Benamy et al. | 35—10.4 |
| 3,355,538 | 11/1967 | Thomas et al. | 35—10.4 |
| 3,413,402 | 11/1968 | Marrero | 35—10.4 |
| 3,439,105 | 4/1969 | Ebeling et al. | 35—10.2 |

MAYNARD R. WILBUR, Primary Examiner
W. W. COCHRAN, Assistant Examiner

U.S. Cl. X.R.

235—61.6; 35—10.4